United States Patent
Matsumoto et al.

(10) Patent No.: US 7,392,204 B1
(45) Date of Patent: Jun. 24, 2008

(54) METHOD FOR SELECTING COSMETICS

(75) Inventors: Kyoko Matsumoto, Tokyo (JP); Takeshi Takeda, Tokyo (JP); Yasuo Goto, Tokyo (JP)

(73) Assignee: Shiseido Co., Ltd., Tokyo (JP)

( * ) Notice: Subject to any disclaimer, the term of this patent is extended or adjusted under 35 U.S.C. 154(b) by 208 days.

(21) Appl. No.: 09/666,184

(22) Filed: Sep. 21, 2000

(30) Foreign Application Priority Data

Oct. 1, 1999 (JP) ................... 11-281596

(51) Int. Cl.
   *G06Q 90/00* (2006.01)
(52) U.S. Cl. ............................. 705/10; 705/1; 345/646; 434/322
(58) Field of Classification Search ............. 434/100; 382/100
   See application file for complete search history.

(56) References Cited

U.S. PATENT DOCUMENTS

| | | | | |
|---|---|---|---|---|
| 4,160,271 A | * | 7/1979 | Grayson et al. | 700/90 |
| 4,842,523 A | * | 6/1989 | Bourdier et al. | 434/371 |
| 5,178,169 A | * | 1/1993 | Lamle | 132/319 |
| 5,311,293 A | * | 5/1994 | MacFarlane et al. | 356/421 |
| 5,450,504 A | * | 9/1995 | Calia | 382/118 |
| 5,478,238 A | * | 12/1995 | Gourtou et al. | 434/100 |
| 5,495,338 A | * | 2/1996 | Gouriou et al. | 356/402 |
| 5,495,539 A | | 2/1996 | Sieverding | |
| 5,562,109 A | * | 10/1996 | Tobiason | 132/200 |
| 5,785,960 A | * | 7/1998 | Rigg et al. | 424/63 |
| 5,797,750 A | * | 8/1998 | Gouriou et al. | 434/100 |
| 5,805,745 A | | 9/1998 | Graf | |
| 5,850,463 A | * | 12/1998 | Horii | 382/118 |
| 5,924,426 A | * | 7/1999 | Galazin | 132/200 |
| 5,933,527 A | | 8/1999 | Ishikawa | |
| 6,233,564 B1 | * | 5/2001 | Schulze, Jr. | 705/14 |
| 6,293,284 B1 | * | 9/2001 | Rigg | 132/200 |
| 6,333,985 B1 | * | 12/2001 | Ueda et al. | 382/100 |
| 6,338,349 B1 | * | 1/2002 | Robinson et al. | 132/200 |

(Continued)

FOREIGN PATENT DOCUMENTS

JP        8-62201        3/1996

(Continued)

OTHER PUBLICATIONS

Rebirth of a Nation, Computer-Style, Time Magazine, vol. 142, Issue 21, Fall 1993.*

(Continued)

*Primary Examiner*—Robert W Morgan
(74) *Attorney, Agent, or Firm*—Rankin, Hill & Clark LLP

(57) ABSTRACT

An average face composition is produced by computer graphic methods surveying average facial features, skin color, lip color and eye color among plural faces representing different human races. Enquiries are performed among a plurality of different people to receive their replies to questions on the obtained faces on which various cosmetics were furnished. The collected comments were analyzed to prepare color maps, whereby necessary information and images were established to enable selection of suitable cosmetics.

8 Claims, 9 Drawing Sheets

U.S. PATENT DOCUMENTS

| | | | |
|---|---|---|---|
| 5,943,045 A | | 8/1999 | Ikeshoji et al. |
| 5,959,736 A | * | 9/1999 | Theuerman et al. .......... 356/402 |
| 6,000,407 A | * | 12/1999 | Galazin ...................... 132/200 |
| 6,091,836 A | * | 7/2000 | Takano et al. ................ 382/118 |
| 6,093,027 A | * | 7/2000 | Unger et al. ................. 434/429 |
| 6,368,113 B1 | * | 4/2002 | Unger et al. ................. 434/429 |
| 6,412,658 B1 | * | 7/2002 | Bartholomew et al. .......... 222/1 |
| 6,496,594 B1 | * | 12/2002 | Prokoski ..................... 382/118 |
| 6,502,583 B1 | * | 1/2003 | Utsugi ........................ 132/200 |
| 6,571,003 B1 | * | 5/2003 | Hillebrand et al. ........... 382/118 |

FOREIGN PATENT DOCUMENTS

| | | |
|---|---|---|
| JP | 10-075823 | 3/1998 |
| JP | 10-255066 | 9/1998 |
| JP | 10-289303 | 10/1998 |

OTHER PUBLICATIONS

Shiseido, Kao offer virtual makeup, The Daily Yomiuri, p. 9, Jun. 30, 1998.*

Manjula Patel, Colouration Issues in Computer Generated Facial Animation, Computing Group School of Mathematical Sciences University of Bath, Computer Graphics Forum 14(2) Jun. 1995 pp. 117-126.*

Jorg Haber, MEDUSA—A Facial Modeling and Animation System, Max Planck Institute.*

Fred Parke et al., NSF Report—Facial Expression Understanding.*

Manjula Patel, Coluration Issues in Computer Generated Facial Animation, Nov. 1993, Computing Group School of Mathematical Sciences University of Bath Bath, Avon U.K., 14 pgs.*

* cited by examiner

Fig.3

|  | 7.5R | 10R | 5YR | 10YR | 5Y | | 5P | 10P | 5RP | | | 4/16 | 4/8 |
|---|---|---|---|---|---|---|---|---|---|---|---|---|---|
| 5R | 5/16 | | | | | | | | 4/12 | | | | |
| 4/12 | | ☐ | | | | | | ☐ | ☐ | | | ☐ | ☐ |
| 5/8 | | ☐ | | ☐ | ☐ | | | ☐ | | 5/8 4/14 2/8 | | ☐ ☐ ☐ | |
| 4/8 | ☐ | | | | | | ☐ 3/8 | | | | | | |
| 4/6 | ☐ | | | | | | | | | | | | |
| 4/4 | ☐ | | | ☐ | | | | | | | | | |
| 3/10 | ☐ | 2/4 | ☐ | | | | | | | | | | |
| 2/8 | ☐ | | ☐ | | | | | | | | | | |

Fig.4

| | | N 6.5 | | |
|---|---|---|---|---|
| | 10Y 2/4 | | 10Y 6/10 | 10G 4/8 |
| | 2.5YR 5/6 | | | |
| | 5YR 6/12 | | 2.5YR 4/2 | 2.5YR 3/4 |
| | 2.5R 3/8 | | | |
| | 10RP 7/8 | | 10RP 5/12 | |
| 10P 3/6 | | 7.5P 5/8 | | 2.5RP 5/10 |
| 7.5PB 4/10 | | 5Y 8/12 | | |
| 10B 2/4 | | 10B 7/8 | | |

METHOD FOR SELECTING COSMETICS

RELATED INVENTION

This invention claims the priority of Japanese Patent Application No. 11-281596 (filed on Oct. 1, 1999) which is expressly incorporated herein by reference in its entirety.

BACKGROUND OF THE INVENTION

In the past, a basic cosmetic such as lip rouge, eye shadow and so on has an important role and produces an attractive image for the user. At this present, there are many kinds of cosmetics comprising various colors and compositions from which to choose. The general user for these cosmetics is confronted with the difficulty of choosing the appropriate cosmetics and, specially the most flattering color.

The present inventors have already provided in Japan a method for selecting basic cosmetics which match the natural color of the user's skin. An object of this invention is to examine a color degree difference of brightness between the natural color of the user's complexion and one or more cosmetics. The user is then advised to select the cosmetic which is lower in its brightness than the natural color of the user's complexion.

The previous methods, however, cannot cover a wide range of users' personalities including their facial features, colors of their eyes and therefore it cannot offer a proper suggestion of cosmetic color. It is now required by users all over world that proper advice should be submitted in accordance with different color complexions, facial features and eye colors of persons of different race and complexions.

SUMMARY OF THE INVENTION

An object of this invention is to provide a method of effectively selecting basic cosmetics for different colored people, wherein the selection can be matched in view of their facial features, skin colors and eye colors.

In order to attain this object, the present invention has adopted the following means:

Through computer graphic methods an average face composition is produced, having average facial features, average skin colors, average lip colors and average eye colors; the obtained data is based on a plurality of different human faces. Then, on the obtained faces, basic cosmetics are furnished, and enquiries are performed for a plurality of different persons for the furnished faces respectively. The result of each enquiry is produced as a color map or an image map for analysis, so that the obtained map may provide suitable color informations or suitable images for the users of the cosmetics.

The other color map regarding different skin colors for a plurality of different races of people is also supplied.

At the same time, another color map regarding eye colors is supplied.

Further, the color map is prepared with "Hue" in a horizontal axis and with "Tone" in a longitudinal axis, and through this map, the desirable color is obtained by an objective view, not by a personal view.

Further, the color map is provided with "Active-Gentle" image in a horizontal axis and with "Fresh-Elegant" image in a longitudinal axis, and this map offers the desirable image thereof.

BRIEF DESCRIPTIONS OF THE DRAWINGS

FIG. 3 is a patch table showing 24 colored rouges for selection.

FIG. 4 is a patch table showing 18 colored eye shadows for selection.

DESCRIPTIONS OF THE PREFERRED EMBODIMENT

The preferred embodiments are now explained hereunder.

This invention has provided an average face composition through a computer graphic performance with average facial features, average skin colors, average lip colors and average eye colors, based on obtained data from a plurality of faces. On the obtained faces, basic cosmetics are shown thereon, whereby enquiries are offered for many different people to receive estimations thereof. The enquiry results are analyzed on a color map, through which matching color informations and desirable images are sought in order to make reasonable selections of the basic cosmetics. The average face is produced in accordance with different human races, such as Caucasians, black skinned people and Asians, and therefore the enquiries are also performed for each race after selecting a plurality of different people belonging to each race. In addition, the color map and image map are prepared according to each race. With regard to skin colors, the average color is a single color which is decided by an average value of examining data, but concerning the eye colors, there are various colors for Caucasians, and following five colors for their eyes are adopted as "Blue", "Dark blue", "Green", "Dark brown" and "Hazel", while black skinned people and Asians are decided singly as "Dark brown".

With respect to Japanese, all properties are confirmed to be included in Asians, and thus Japanese are in the same category as other Asians.

The average face is obtained by a computer graphic method known as "Morphing Technology" through which the final image is in an intermediate result.

Figure 1:
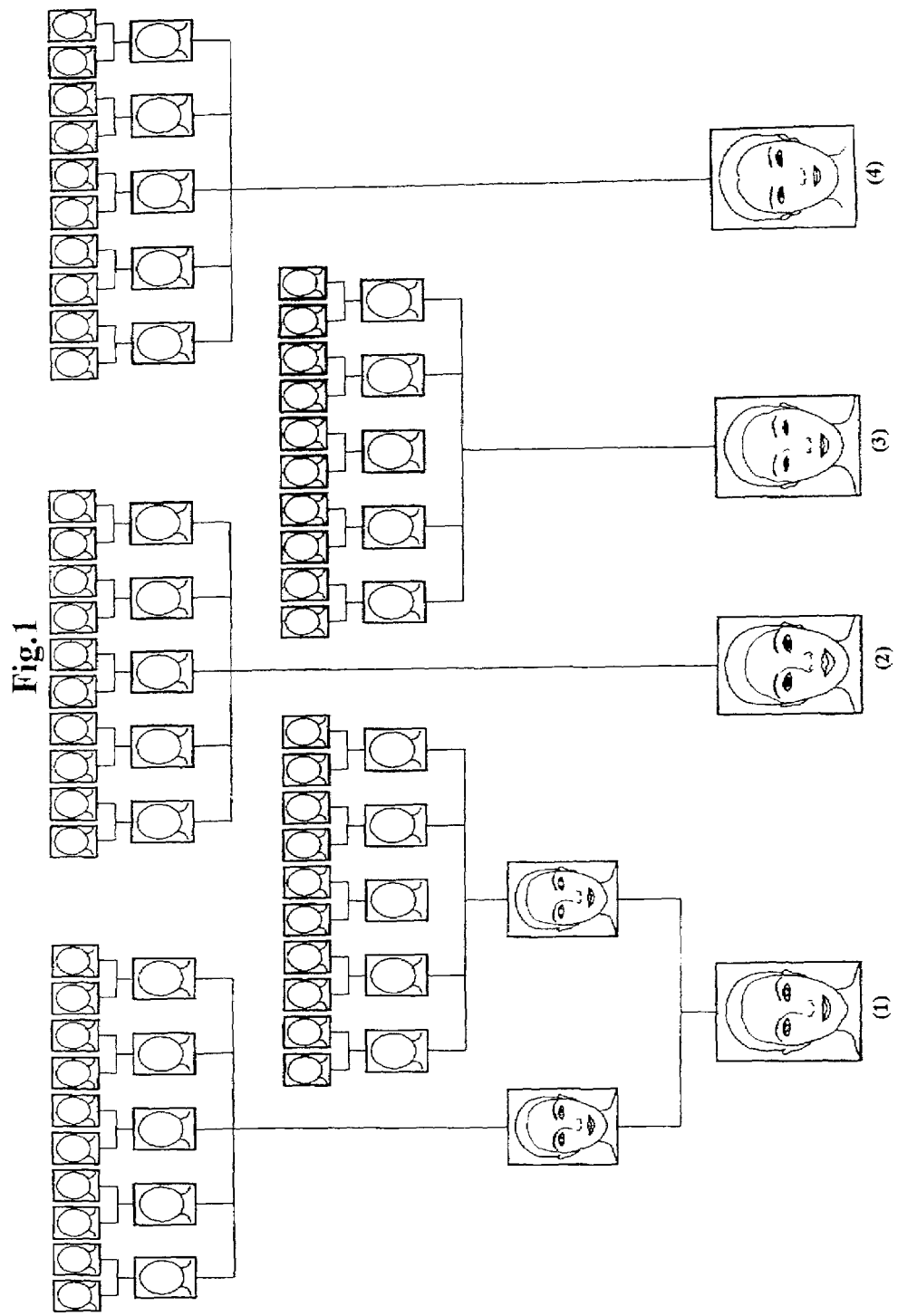
FIG. 1 shows the process of producing an average face, such as Caucasians (1), Asians (4), black skinned people (2) and Japanese (3).

FIG. 1 shows the procedure to provide the average face. A total of 600 faces are collected from all over the world, and from these 70 are selected. 57 Important points such as the facial features, both corners of the eye, both corners of the mouths are measured for the selected 70 people, and by the morphing technology, the 4 average faces for Caucasians (1), Asians (4), black skinned people (2) and Japanese (3) are expressed.

Figure 2:
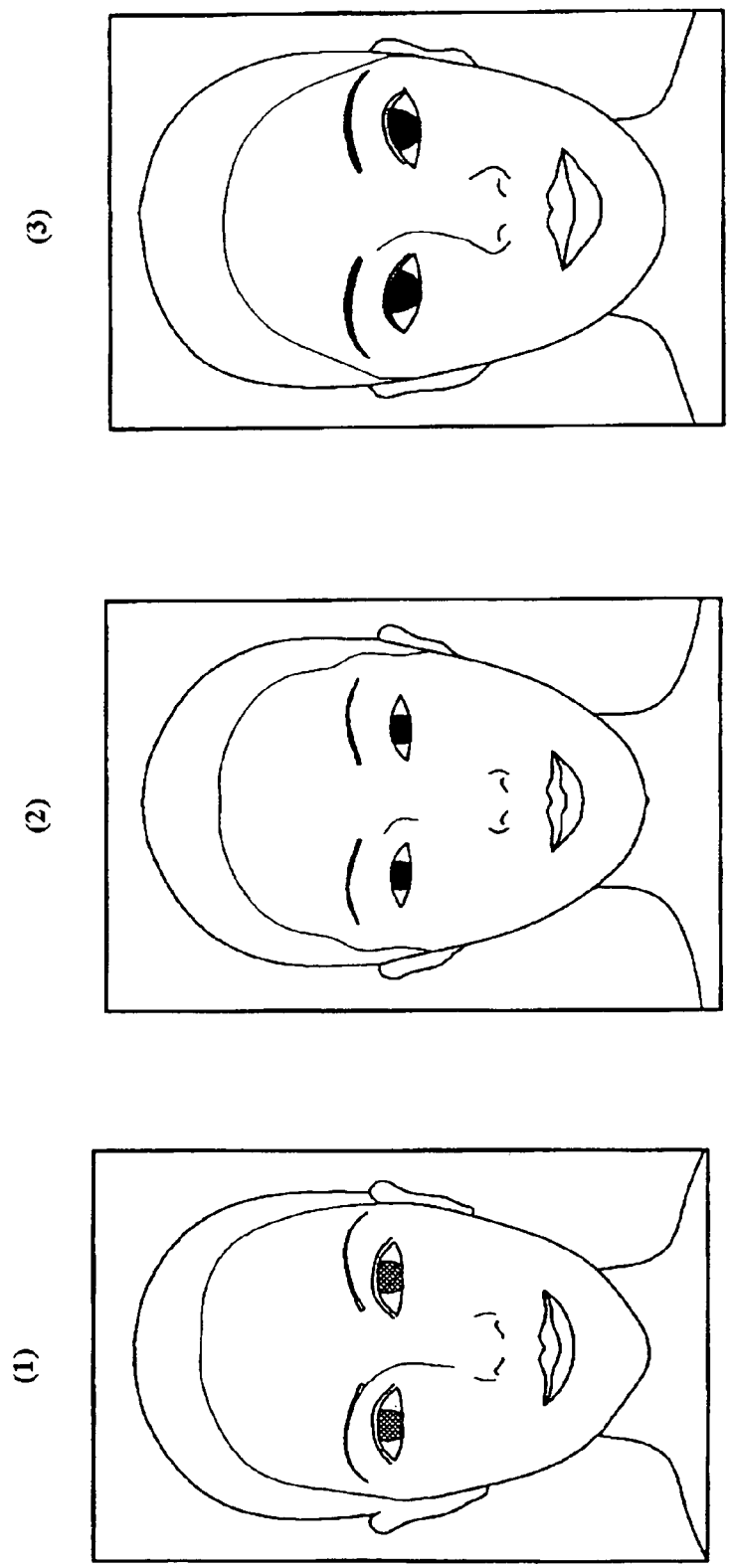
FIG. 2 shows enlarged faces for caucasians (1), Asians (2) and black skinned people (3) respectively.

FIG. 2 shows the enlarged three average faces for Caucasians (1), Asians (2) and black skinned people (3).

With regard to skin colors, the average color is obtained through examining data performed over 254 Caucasians, 74 black skinned people and 309 Asians.

Concerning eye colors, as already explained, the five colors are adopted for "Blue", "Blue grey", "Green", "Dark brown" and "Hazel" for Caucasians, while only a single color of "Dark brown" is adopted for both Asians and black skinned people.

Next, on the average face, the lip rouge and the eye shadow are furnished by the computer graphic method, and photographs are produced after copying the display of the computer graphic, and thus obtained photographs are reserved as the data for the enquiry. The enquiry is submitted to a selected plurality of people, in other words, 64 Caucasians from New York and Paris, 92 Asians from Hongkong and Japan, and 10 black skinned from New York.

According to FIG. 3, the furnished colors of the lip rouge total 24 colors.

With reference to FIG. 4, the furnished colors of the eye shadow total 18 colors.

The colors as explained above were furnished on each average faces and photographs were completed as the enquiry data. Then, each photograph was shown to the selected persons to answer the enquiry. The enquiry articles are shown below, for which they were requested to offer their replies after choosing the proper photograph or photographs.

With regard to the lip rouge, the enquiry sentences are

1. The color of the skin looks healthy.

2. The color feels white.

3. The color feels black.

4. The color looks pretty.

5. The color looks bright.

6. The color of the rouge is striking.

7. The contrast between the color of the skin and that of the rouge is too strong.

8. The rouge is compatible with the color of the skin.

9. The image impression received from the total face looks fresh and active.

10. The image impression received from the total face looks fresh and gentle.

11. The image impression received from the total face looks elegant and active.

12. The image impression received from the total face looks elegant and gentle.

13. The image impression received from the total face looks pretty.

14. The color of the rouge is matching.

15. The total image received from the total face is charming.

16. The total image received from the total face is stylish.

17. The total image received from the total face is preferable.

The responders could offer their replies including plural articles, but they were also requested to select a single photo which looked as the most suitable one. The 4 articles described from 9 to 12 are prepared to receive the image impressions or informations derived from the color maps.

With regard to the eye shadow, the following questionnaires are submitted:

1. The color of the eye looks attractive.

2. The color looks pale.

3. The color looks dark.

4. The color looks pretty.

5. The color looks bright.

6. The color is striking.

7. The contrast between the color of the eye and that of the eye shadow is too strong.

8. The eye shadow is compatible with the color of the eye.

9. The image received from the balance between the eye shadow and the eye looks fresh and active.

10. The image received from the balance looks fresh and gentle.

11. The image received from the balance looks elegant and active.

12. The image received from the balance looks elegant and gentle.

13. The underside of the eye is pretty.

14. The eye shadow is matching.

15. The underside of the eye is charming.

16. The underside of the eye is stylish.

17. The total image received from the total face is preferable.

The responders could offer their replies including plural articles, but they were also requested to select a single photo which looked as the most suitable one. The 4 articles described from 9 to 12 are prepared to receive the image impressions or informations derived from the color maps.

All data are collected and the results are analyzed by the computer, whereas matching rouges and matching eye shadows are probed in accordance with each group, Caucasians, Asians and black skinned people, and what colors are most suitable for the users.

Figure 5:
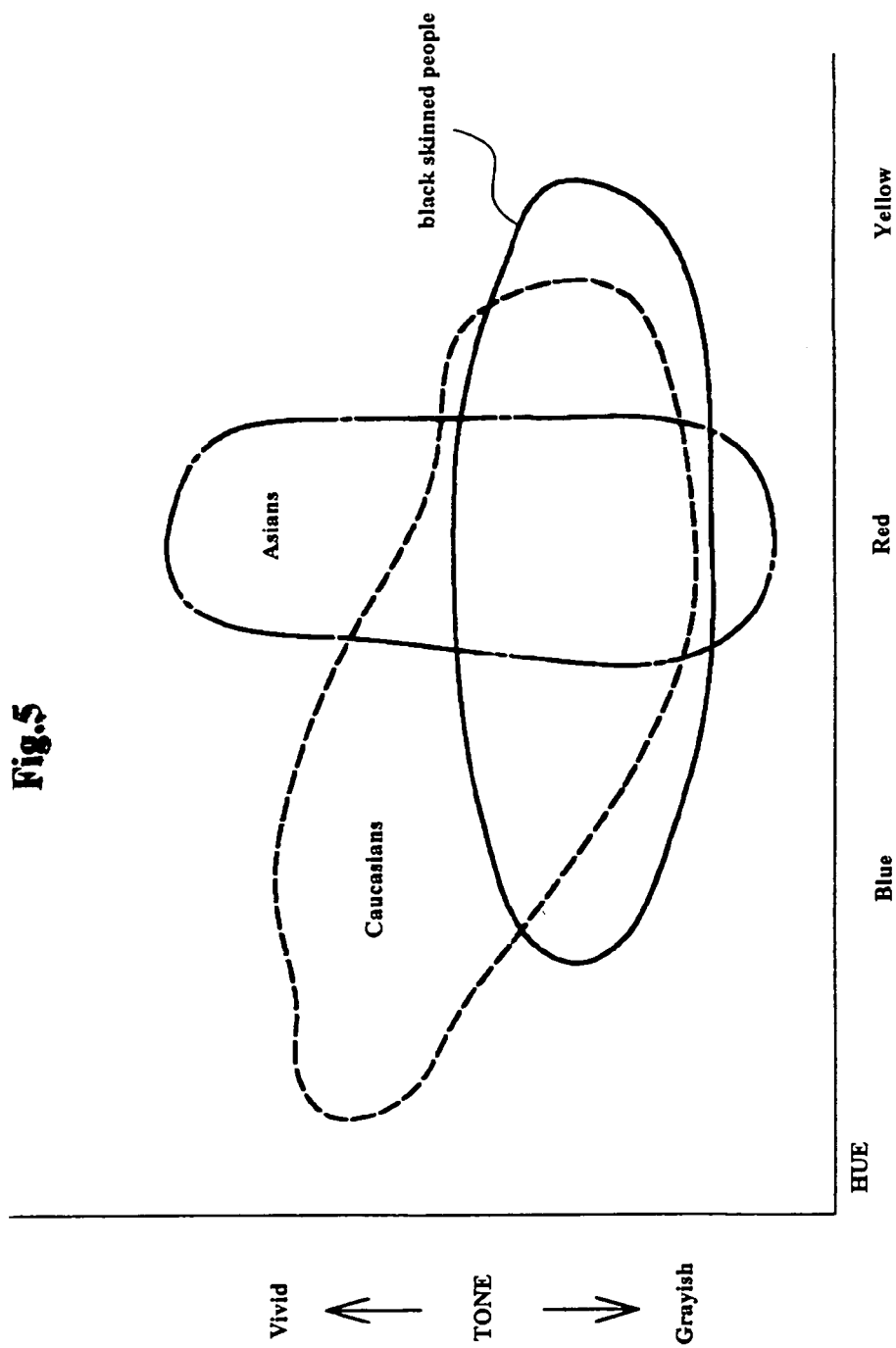
FIG. 5 is an image map showing a matching range of rouge color for Caucasians, Asians and black skinned people.
Figure 6:
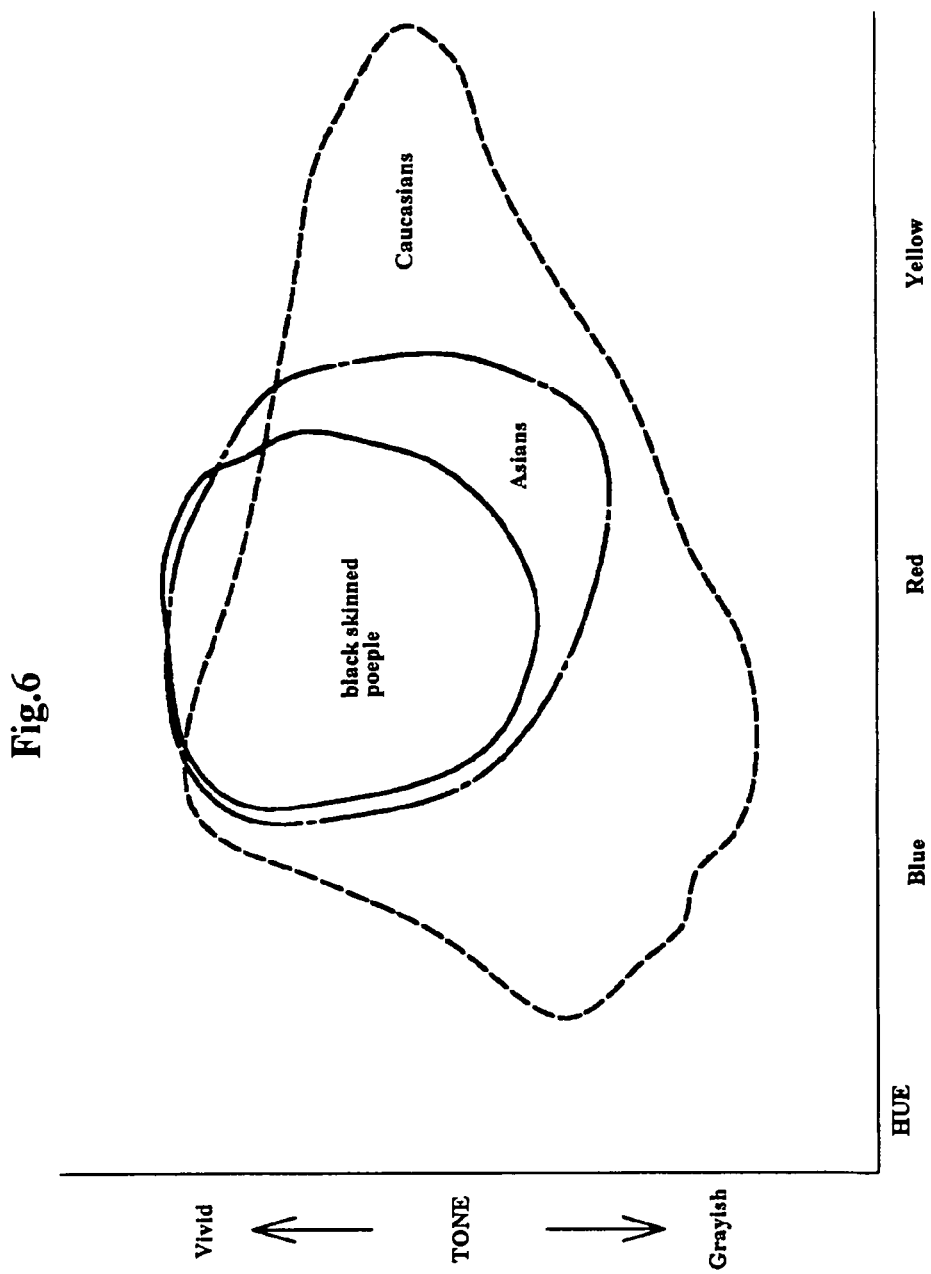
FIG. 6 is an image map showing a matching range of eye shadow same as FIG. 5.

In FIG. 5 and FIG. 6, image maps are shown for each group of people, wherein a hue is expressed in a horizontal axis while a tone is expressed in a longitudinal axis.

In these figures, a range surrounded by a dotted line belongs to Caucasians and a range surrounded by a broken line belongs to Asians while a range surrounded by a solid line belongs to black skinned people.

FIG. 5 is an image map for rouge. According to the map, it is found that the matching color is dependent upon the racial difference. The hue expression of the skins and the difference of their brightnesses have important effects. In general, it can be said that when the color of the rouge is lower in brightness than that of the skin it matches, while the matching color becomes limited in case where the skin increases its yellowish hue.

With reference to FIG. 5, its analysis shows that Caucasians have a wide range both for hue and tone, while Asians have a limited range of the hue only for the reddish hue but have a wide range for the tone. On the contrary, black skinned people have a limit range of the tone only for deep, dark or grayish tones but have a wide range for hue.

FIG. 6 is the image map for the eye shadow. As a result of its analysis, it is also found that the matching color is dependent on the racial difference. The hue expression of the skins and the facial features have great effects. In general, the skin color having a high brightness has a wide range of matching colors, and the face having a cubic feeling has a wide range for its matching hues by a so-called gradation effect.

Accordingly, it is shown that Caucasians have wide ranges both for the hue and tone, and Asians have a wide range of tones but have a narrow range for hue which is limited to blue and brown, while black skinned people have limited ranges for hue such as blue and brown and for tone such as vivid and moderate.

With regard to FIG. 6, the image map for Caucasians is expressed after the totalized value for 5 colors of eyes, namely blue, blue-grey, green, hazel and dark brown. However, for the further references, the above five colors are assorted to three groups of blue and blue gray, green and hazel and dark brown, and they are shown in FIG. 7, FIG. 8 and FIG. 9 respectively.

Figure 7:
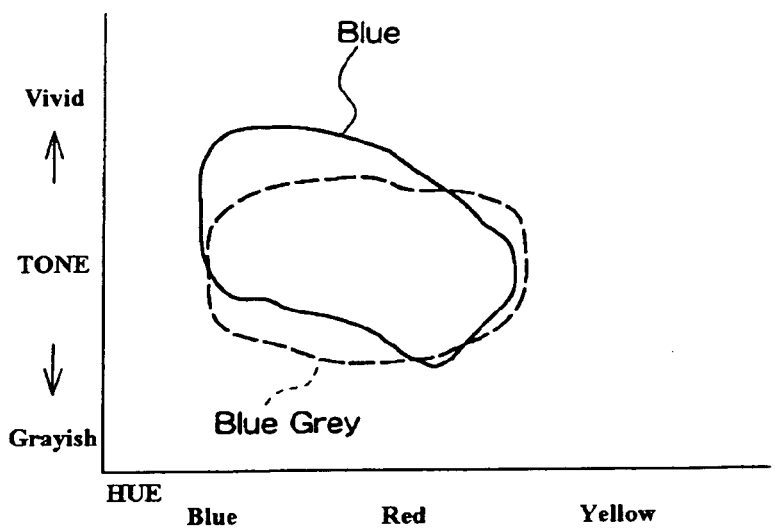
FIG. 7 is an image map expressing a color information of matching eye shadow in accordance with blue or blue-grey colored eyes.

FIG. 7 shows an image map in the eye color of blue and blue grey.

Figure 8:
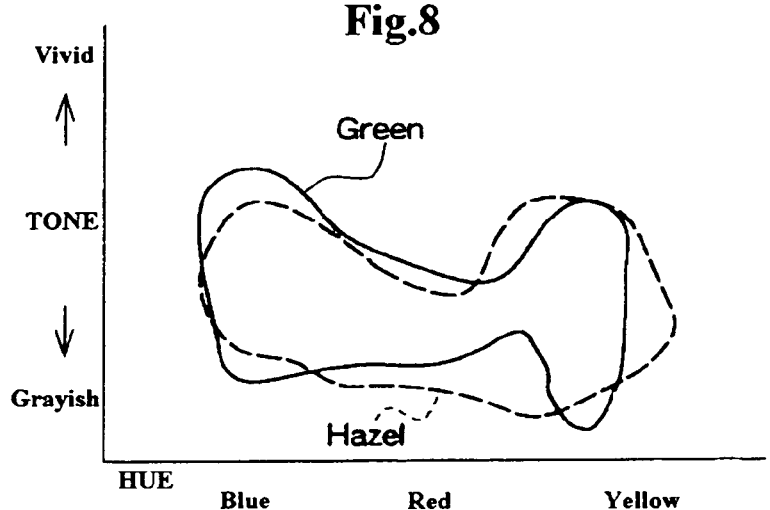
FIG. 8 is an image map expressing a color information of matching eye shadow in accordance with green or hazel colored eyes.

FIG. 8 shows an image map in green and hazel.

Figure 9:
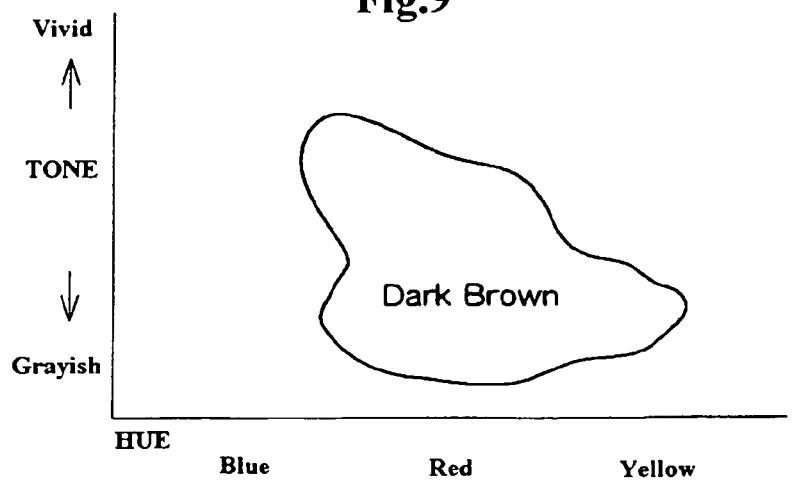
FIG. 9 is an image map expressing a color information of matching eye shadow in accordance with dark-brown eyes.

FIG. 9 shows an image map in dark brown.

With reference with these three figures, it is shown that the matching color for the eye shadow varies within each group. Some prefer their eye shadow to correspond to the color of their eyes, while others prefer a contrasting color. In view of these facts, through color balance theory, the combination of the similar colors between the eye color and the shadow is regarded as "Elegant" or "Calm", while the use of contrasting colors is regarded as "Striking" and "distinctive".

Figure 10:
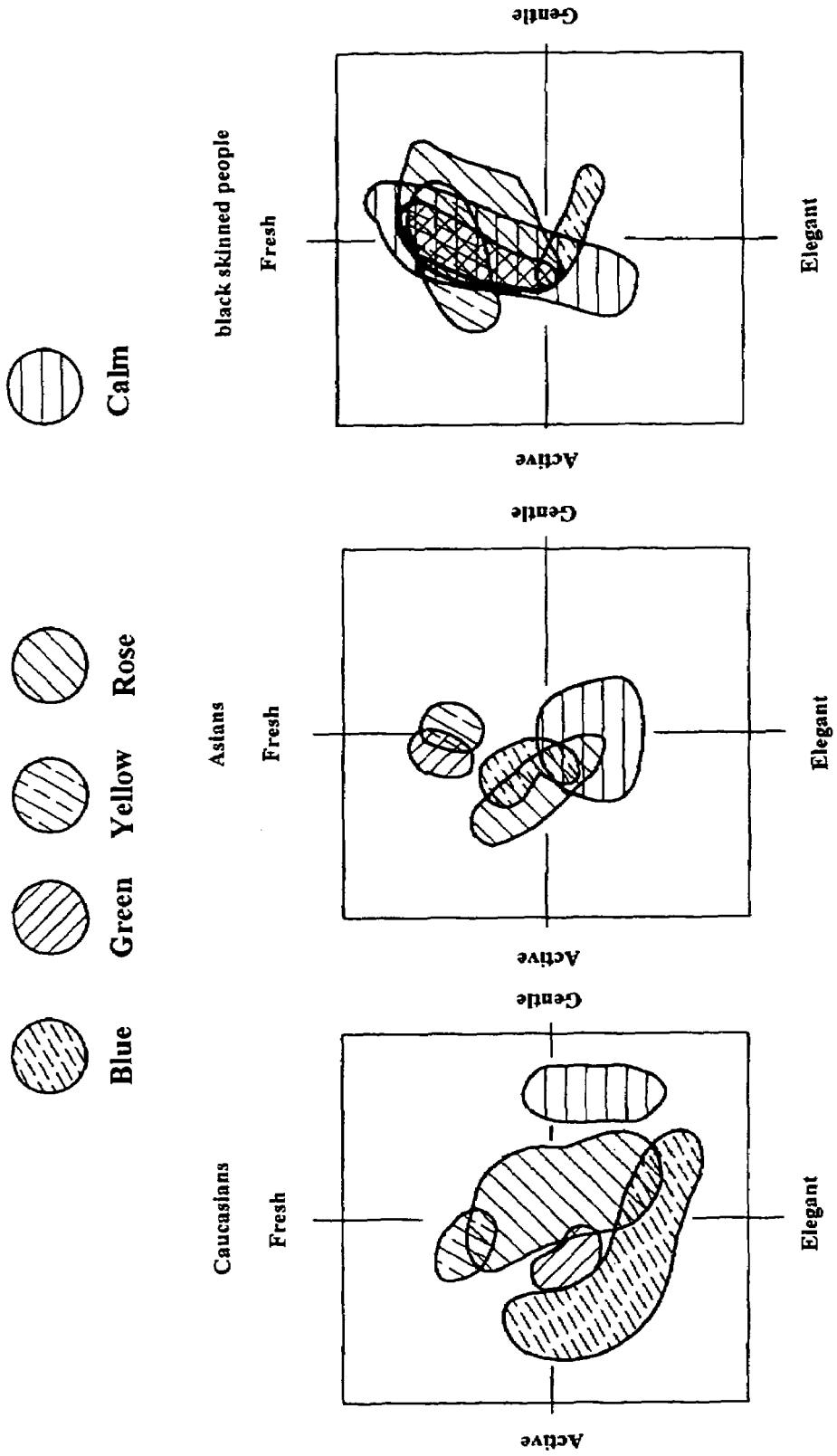
FIG. 10 shows three color maps for Caucasians, Asians and black skinned people, wherein the image for three people is expressed respectively.

With reference to FIG. 10, the image colors are shown in accordance with the three different races, wherein the 5 selected colors of "Blue", "Green", "Yellow", "Rose" and "Calm" for the eye shadow are furnished, and thus it is checked how these colors produce differences in each group of people. The horizontal axis relates to the hue of the skin while the longitudinal axis relates to the brightness of the skin. On the other hand, the image of "Fresh" is positioned upward on the longitudinal axis while the image of "Elegant" is positioned downward on the longitudinal axis. The image of "Active" is positioned toward the left side of the horizontal axis while the image of "Gentle" is positioned toward the right side of the axis. On checking FIG. 10, it is found that the image obtained by the color of the eye shadow tends to be influenced by each different race and is also influenced by the difference of the skin color. In general, when the brightness of the skin color becomes lower, the image moves into the direction of "Fresh", whereas the range of image color becomes limited. It is also understood that the image of Caucasians brought by the color of the eye shadow disperses in a wide range, which enables Caucasians to express their images by free selection of the eye shadow colors. In Asian people image, the color of "Yellow" and "Green" lies toward the center and the image is not fixed by the color, which enables Asian people to make use of a wide range of colors. In black skinned people, their image lies mostly in "Fresh", without the expansion along the horizontal axis of "Active" and "Gentle". This expresses the limited range which makes the most of the eye shadow colors.

Figure 11:
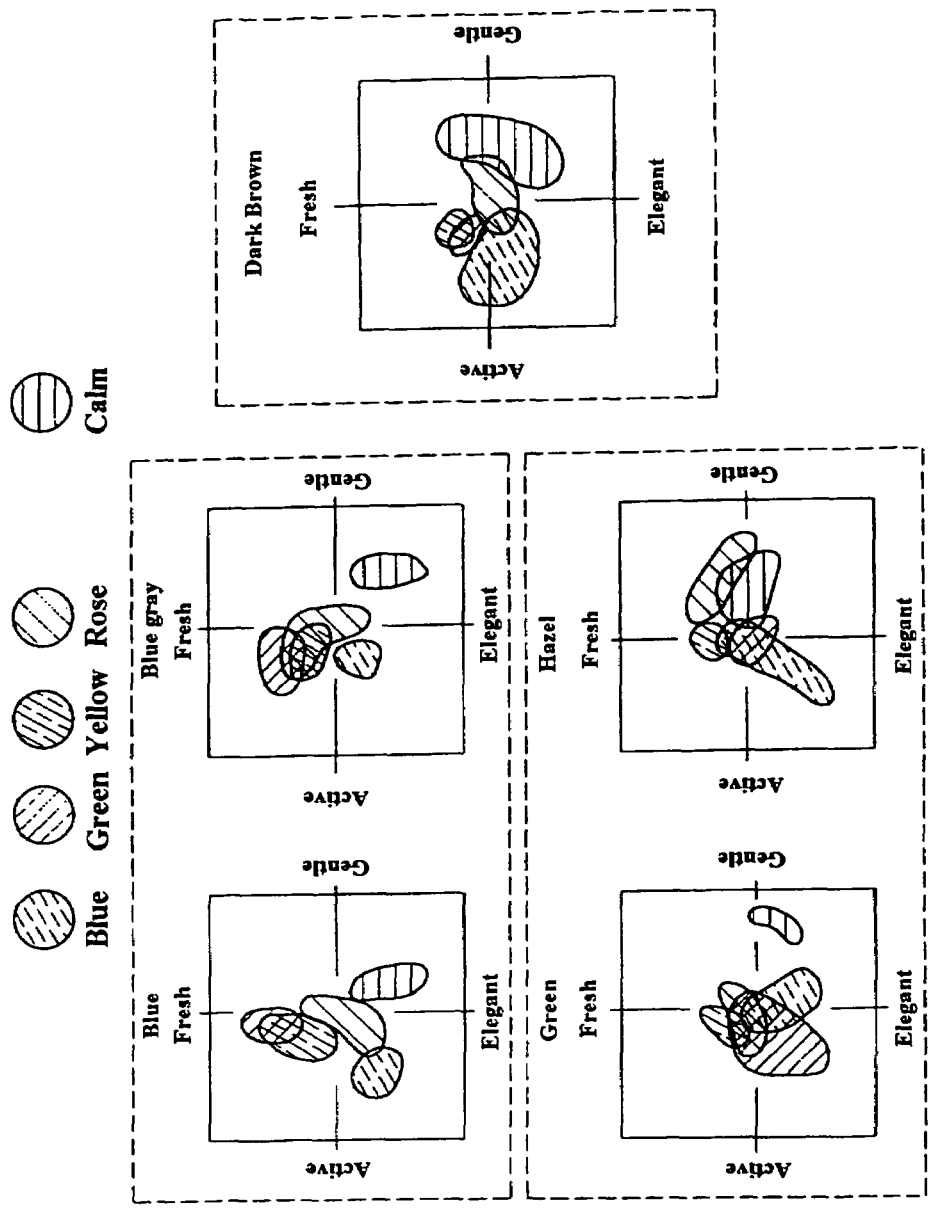
FIG. 11 shows color maps in accordance with the furnished colors of eye shadows.

Referring to FIG. 11, the image colors are shown in accordance with the different colors of the eye. In this figure, it is acknowledged that the image expression is different according to the eye colors even in the same race. When the eye shadow color is similar to the eye color, it brings the image of "Elegant" or "Feminine". When the eye color shadow is contrasts with the eye color, it brings the image of "Fresh" and "Cute".

As explained before, the colors of the eyes are assorted into three groups, as "Blue and Blue grey", "Green and Hazel" and "Dark brown" respectively, and the images are expressed thereof.

This invention can provide a method for selecting basic cosmetics for all users, corresponding with the facial features, skin color and eye color, wherein one can select the correct combination thereof to purchase the proper cosmetics with ease.

It is further understood by those skilled in the art that the foregoing description is preferred embodiment of the disclosed method and that various changes and modifications may be made in this invention without departing from the spirit and scope thereof.

What is claimed is:

1. A method for selecting suitable eye shadow and/or rouge cosmetics, which comprises:

obtaining through computer graphic methods an average face composition of each of a plurality of races by a survey of average facial features, skin color, lip color and eye color of a plurality of people;

performing enquiries among a plurality of different races of people for the average face on which eye shadow and rouge are furnished to receive resulting eye shadow and rouge opinions of those people;

collecting the resulting opinions and showing results as color maps and image maps of the plurality of races based on an analysis of said resulting opinions by computer;

obtaining color information from said color maps and image maps of the plurality of races, in order to find matching eye shadow and rouge colors and desirable images; and selecting suitable eye shadow and/or rouge cosmetics based upon said matching eye shadow and rouge colors and desirable images.

2. A method for selecting suitable eye shadow and rouge cosmetics according to claim 1, wherein color maps to obtain information based on enquiries are produced in accordance with different races.

3. A method for selecting suitable eye shadow and rouge cosmetics according to claim 1, wherein the color maps based on enquiries are produced in accordance with different eye color and by obtaining maps where desirable images are clarified for selection.

4. A method for selecting suitable eye shadow and rouge cosmetics according to claim 1, wherein the color maps comprise charts having a horizontal axis showing hues and a longitudinal axis showing tones.

5. A method for selecting suitable eye shadow and rouge cosmetics according to claim 1, wherein the color maps comprise charts having a horizontal axis expressing an image of "Active-Gentle" and a longitudinal axis expressing an image of "Fresh-Elegant".

6. A method for selecting suitable eye shadow and rouge cosmetics according to claim 1, wherein the computer graphic methods are a method known as morphing technology.

7. A method of selecting suitable eye shadow and rouge cosmetics according to claim 1, wherein the average face has a plurality of important points which include corners of the eye.

8. A method of selecting suitable eye shadow and rouge cosmetics according to claim 1, wherein the average face has a plurality of important points which include corners of the mouth.

* * * * *